United States Patent [19]

Ruby

[11] Patent Number: 5,029,500
[45] Date of Patent: Jul. 9, 1991

[54] CAM SHAFT TOOL

[75] Inventor: Daniel L. Ruby, Troy, Mich.

[73] Assignee: Sandvik AB, Sandviken, Sweden

[21] Appl. No.: 528,489

[22] Filed: May 25, 1990

Related U.S. Application Data

[63] Continuation of Ser. No. 200,919, Jun. 1, 1988, Pat. No. 4,938,110.

[51] Int. Cl.$^5$ .............................................. B23B 29/00
[52] U.S. Cl. ...................................... 82/138; 82/106; 82/158; 407/68; 407/69; 407/71
[58] Field of Search ................... 407/67, 68, 69, 70, 407/71, 73, 75, 77, 79, 85, 86, 87, 102, 101; 82/138, 158, 159, 160, 161, 106, 107

[56] References Cited

U.S. PATENT DOCUMENTS

| | | | |
|---|---|---|---|
| 2,861,322 | 11/1958 | Benes et al. | 407/71 |
| 2,877,536 | 3/1959 | Monosmith | 407/71 |
| 2,900,704 | 8/1959 | Sweet | 407/68 |
| 3,078,547 | 2/1963 | Sweet | 407/69 |
| 4,938,110 | 7/1990 | Ruby | 82/106 |

Primary Examiner—Frederick R. Schmidt
Assistant Examiner—Blynn Shideler
Attorney, Agent, or Firm—Burns, Doane, Swecker & Mathis

[57] ABSTRACT

A cam shaft tool for a slide type lathe. The invention generally comprises an improved adjustable tool wherein a plurality of holders each carrying a cutting insert is fixed to a main block via an adjustment block. The holder is radially adjustable relative to said adjustment block and axially relative to said main block. The invention also relates to a cutting insert holder for use in a cam shaft tool.

3 Claims, 5 Drawing Sheets

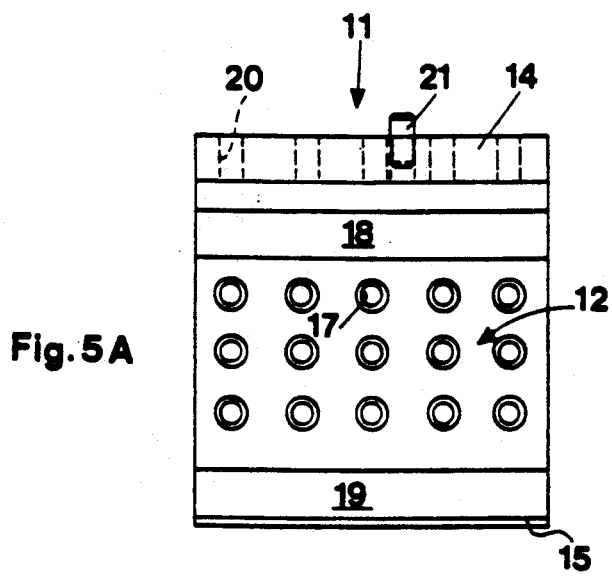
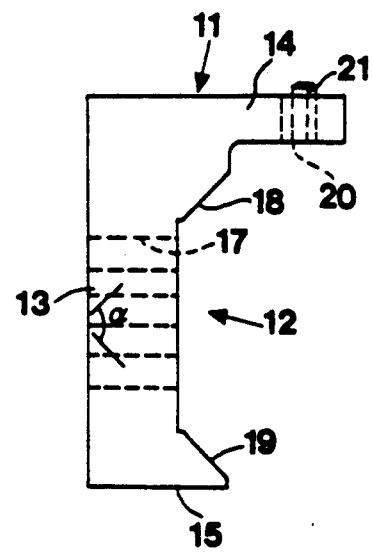
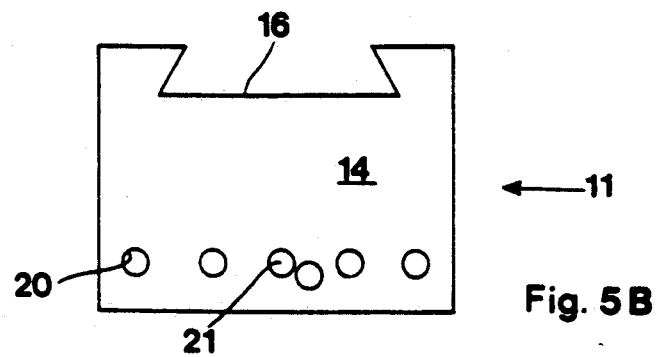
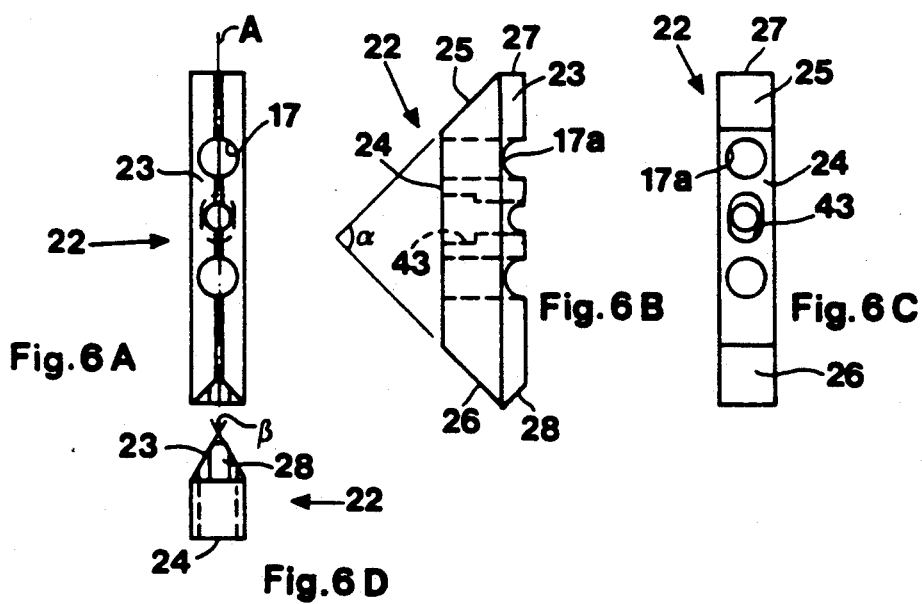
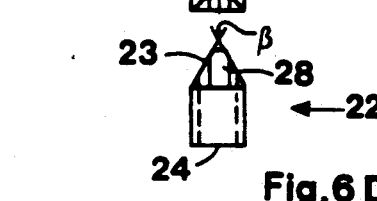

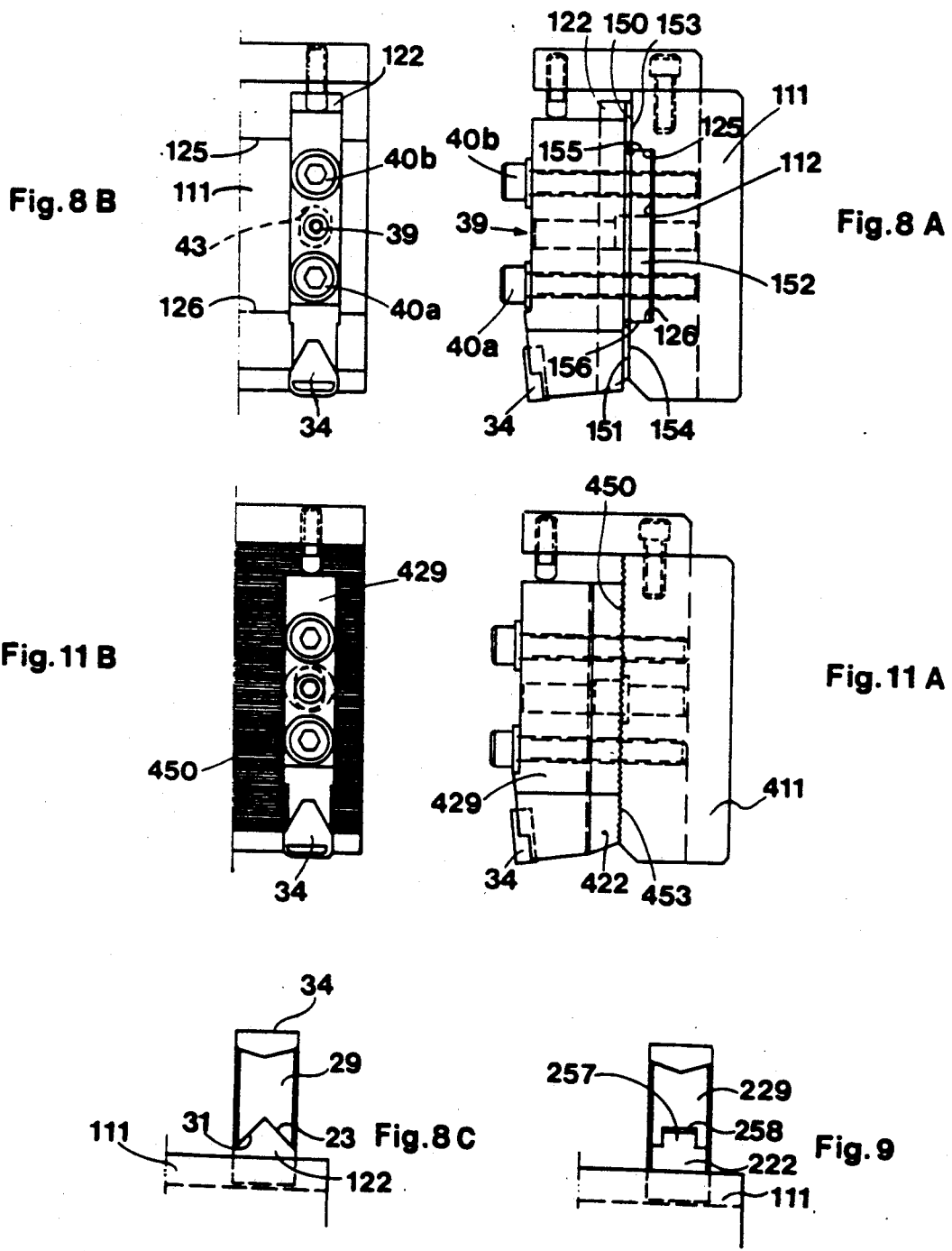

5,029,500

CAM SHAFT TOOL

This application is a continuation of application Ser. No. 07/200,919, filed Jun. 1, 1988 now U.S. Pat. No. 4,938,110.

FIELD OF THE INVENTION

This invention relates to a cam shaft tool and, more particularly, to a tool having cutting inserts being adjustable in a radial and an axial direction relative to a work piece. Furthermore the invention relates to a cutting insert holder for use in a cam shaft tool.

BACKGROUND OF THE INVENTION

A common method of making cam shafts is by turning and grinding work pieces. Hitherto cam shaft manufacturers have used a lathe wherein radially movable slides carrying a plurality of holders with fixed spatial relationship are independently movable with respect to one another. The holders, each of which is provided with a cutting insert, have been possible to set relative to the slides in a transverse or radial direction with respect to the rotable work piece. The principal disadvantages, however, of these prior art cam shaft tool reside in the necessities for carefully machining of the axial reaction surfaces for each holder and for the lack of axial positioning possibility.

SUMMARY OF THE INVENTION

A cam shaft tool for cutting a plurality of grooves in a rotating work piece having a radial and an axial direction comprising:
a first block having a plurality of second blocks mounted thereon, said first and second blocks having mating first abutment surfaces for guidance of said second blocks in said axial direction;
each said second block carrying a holder having a cutting insert at a radially forward end thereof,
each said second block and said holder including mating second abutment surfaces for guidance of said holder in said radial direction;
a plurality of radial setting means for adjusting said holder relative to said second block in said radial direction;
a plurality of axial setting means for adjusting said second blocks relative to said first block in said axial direction; and a plurality of fastening means for fixing the relative positions of said holders, said second blocks and said first block.

Accordingly, it is an object of the present invention to provide a new and improved tool for turning cam shafts in a lathe that is easily able to be set.

Another object of the present invention is to provide a new and improved tool for accurate positioning of the cutting insert in the radial and the axial directions.

Still another object of the present invention is to provide a new and improved tool for accurate fixation of the positioned cutting insert.

BRIEF DESCRIPTION OF THE DRAWINGS

The foregoing and other objects of this invention, which will become more fully apparent from the following detailed description, may be achieved by means of the exemplifying apparatus depicted and set forth in this specification in connection with the accompanying drawings. Similar references numerals refer to similar parts throughout.

FIGS. 5A, 5B and 5C show a front view, a rear view and a side view, respectively, of a part of the tool;

FIGS. 6A, 6B, 6C and 6D show a front view, a side view, a rear view and a bottom view, respectively, of another part of the tool;

FIGS. 8A, 8B and 8C show another embodiment of a cam shaft tool according to the invention in a side view, a partial front view and a partial bottom view, respectively;

FIG. 9 shows another embodiment of a cam shaft tool according to the invention in a bottom view;

FIGS. 11A, 11B and 11C show another embodiment of a cam shaft tool according to the invention in a side view, a front view and a bottom view, respectively.

DETAILED DESCRIPTION OF PREFERRED EMBODIMENTS

Figure 2:
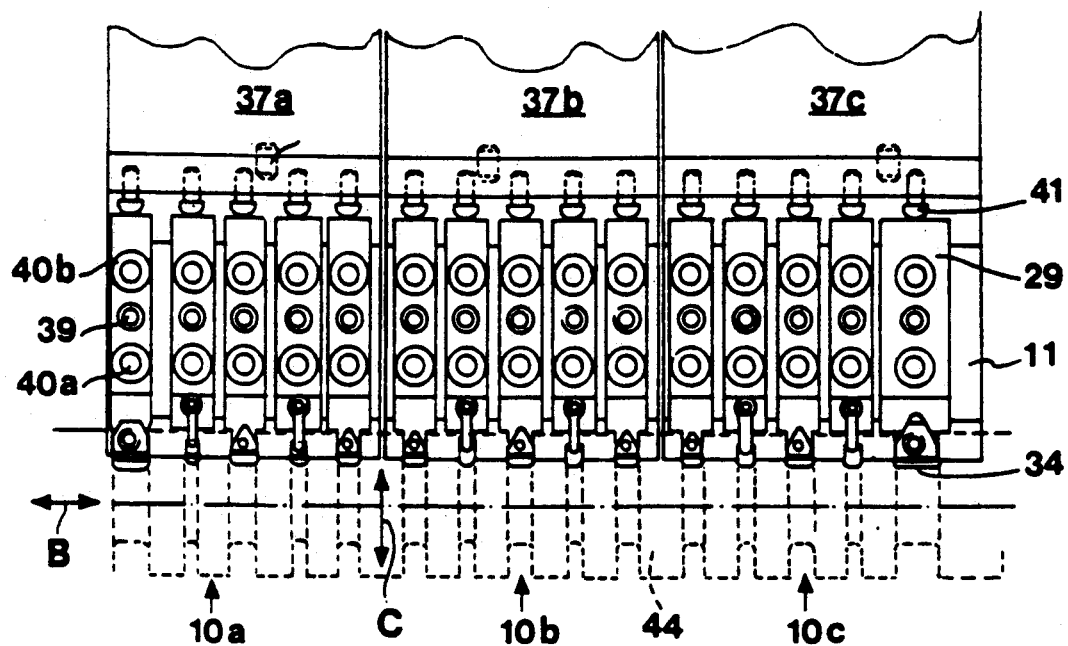
FIG. 2 is a side view of the cam shaft tool in operation shown in FIG. 1.
Figure 1:
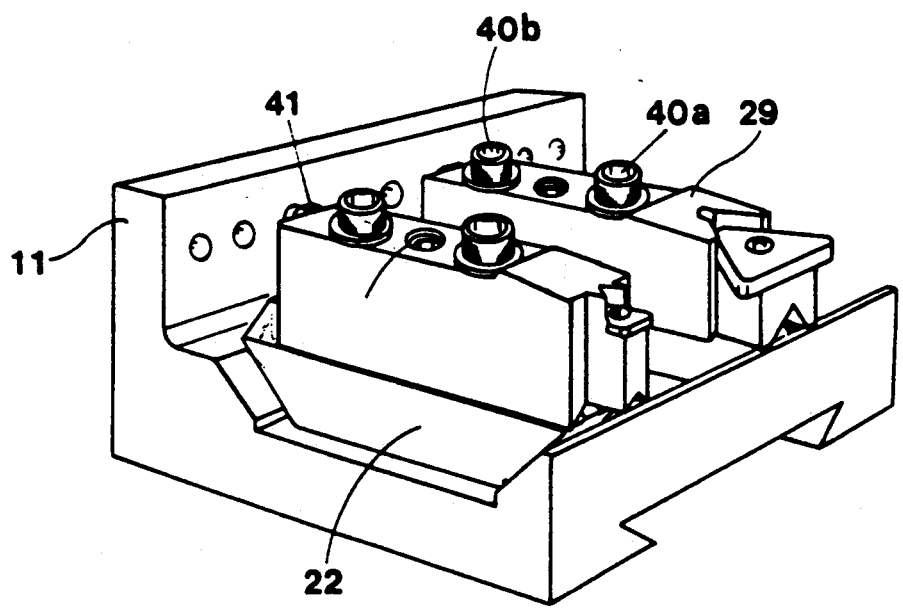
FIG. 1 is a perspective view of an embodiment of a cam shaft tool according to the present invention.
Figure 3:
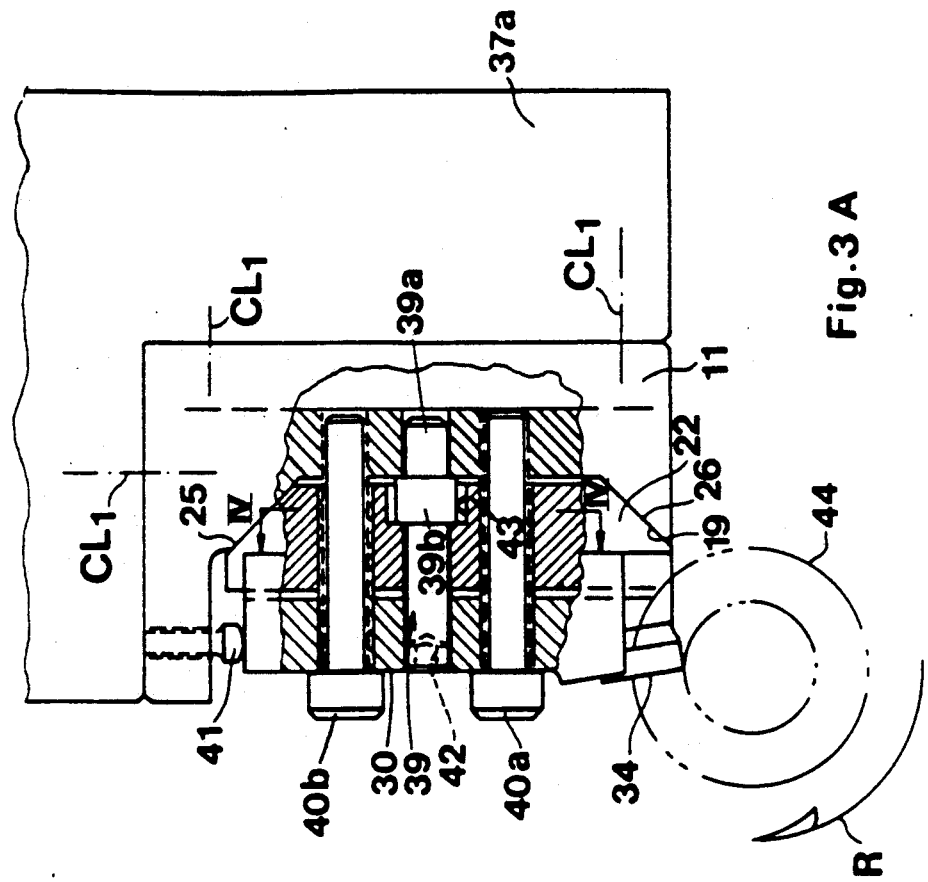
FIG. 3A is a side view of the cam shaft tool, partially in section.
FIG. 3B is a partial front view of the cam shaft tool.
FIG. 3C is a partial bottom view of the cam shaft tool.
Figure 3:
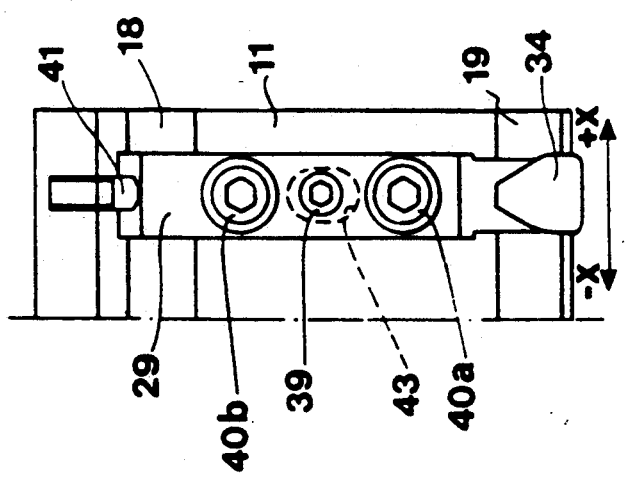
Figure 3:
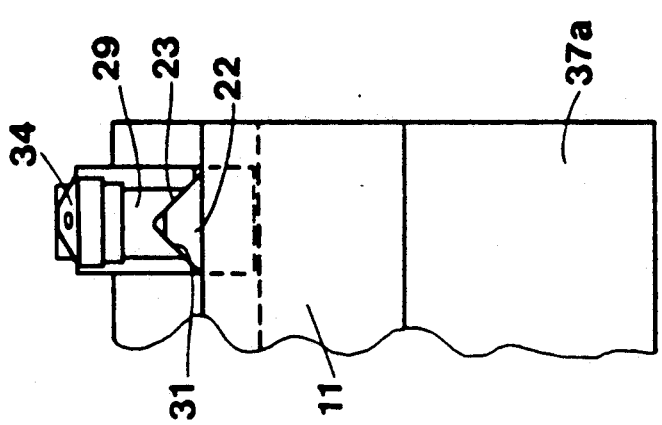

With reference to FIGS. 1 to 4, a machine lathe embodying the invention is partially shown. The lathe is of a conventional type and is therefore not shown or described in detail. The lathe has vertically movable slides 37a, 37b and 37c whose positions depend on hydraulic means (not shown). The lathe may alternatively have horizontally movable slides. Each slide carries a cam shaft tool 10a, 10b and 10c which includes a main block 11, five adjustment blocks 22, five holders 29 and five cutting inserts 34. The amount and widths of the cutting edges of the inserts vary because the work piece or the cam shaft 44 usually should have grooves of different amount and widths. The work piece 44 has a longitudinal or axial direction B and a transverse or radial direction C. The tool further includes setting and fastening mechanisms 41, 39 and 40a, 40b, respectively.

With reference to FIGS. 5A to 5C a main block is shown having a recess 12 whose cross-section is generally trapezoidal. The main block 11 includes a rectangular base section 13 at whose upper and lower parts are projecting an upper flange 14 and a lower flange 15. The flanges 14 and 15 project generally perpendicularly outwards from the front side of the base section 13. The upper flange is shown being integral with the main block 11 but it may alternatively be releaseably mounted thereon. Opposed to the front side is a rear side in which a dove-tail groove 16 is arranged. The base section 13 is provided with a plurality of parallel rows of holes 17, preferably five rows. Each row comprises three holes perpendicular to the base surface, the two extreme or outermost holes of which are threaded. Each row lie in the radial direction of the work piece. The inner surfaces 18 and 19 of the flanges 14 and 15 are inclined so as to reduce the area of the recess 12 and thus converge in direction towards the base section 13.

The inner surfaces 18 and 19 enclose an angle α about 90 degrees. The size of the angle may vary. The upper flange 14 extends from the base section 13 nearly twice the projecting distance of the lower flange 15. The upper flange 14 also includes threaded holes 20, each of which is aligned with a corresponding row of holes 17. Each hole 20 extends generally perpendicular to the upper flange. A dowel pin 21 is secured into the outer side of the upper flange 14. The groove 16 is to receive a projection of a radially movable slide of the lathe which projection has a dove-tail profile. Alternatively the main block 11 may be secured to the slide solely by means of bolts Without any groove.

Referring to FIGS. 6A to 6D an elongated second block or adjustment block 22 is shown. The adjustment block has a rectangular basic shape as seen in a front view (FIG. 6A) and includes a V-shaped projection or front surface 23 and a planar rear surface 24. The block 22 has plane-parallel side surfaces and it has first top and bottom surfaces 25 and 26, respectively, which converge under an angle α about 90 degrees, towards the rear surface 24, thus forming a generally trapezoidal base portion which is to project into the recess 12 of the main block. Furthermore, a row of three holes 17a extend through the block, none of said holes 17a are threaded. The holes 17a extend perpendicularly to the rear surface 24 and the center lines thereof intersect the longitudinal axis A of the block 22. The central hole of the roW of holes has a mainly oval enlargement 43 at the end thereof connected to the rear surface 24. The first top and bottom surfaces 25 and 26, respectively, meet second top and bottom surfaces 27 and 28, respectively, in direction generally towards the front surface 23. The convex V-shaped front surface 23 enclose an angle β about 90 degrees.

Figure 7A:
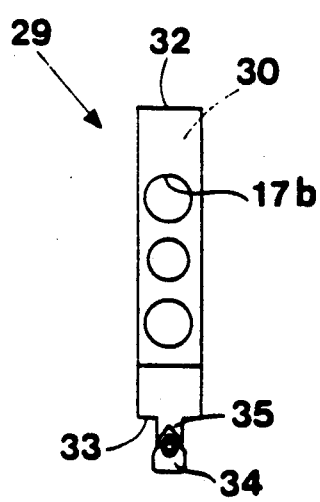
FIGS. 7A, 7B and 7C show a front view, a side view and a bottom view, respectively, of still another part of the tool.
Figure 7B:
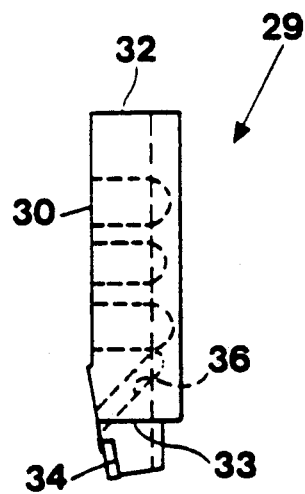
Figure 7C:
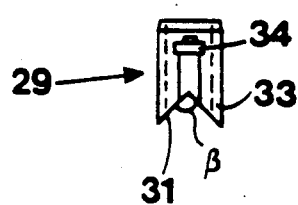
Figure 4:
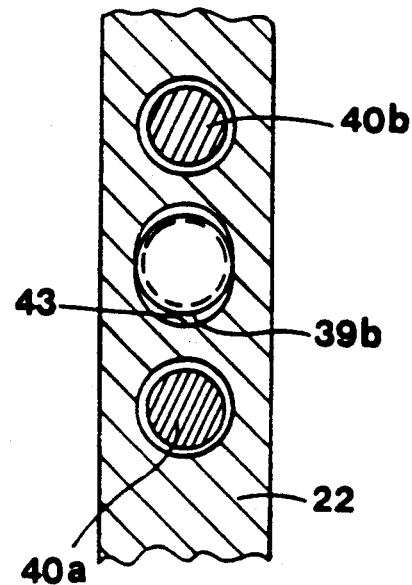
FIG. 4 is a sectional view taken along line IV—IV of FIG. 3A.

Referring now to FIGS. 7A to 7C an elongated holder 29 is shown which has a rectangular basic shape, when seen in a front view (FIG. 7A), including plane-parallel side surfaces, a planar front surface 30, a V-shaped recess or rear surface 31 enclosing an angle β about 90 degrees and plane-parallel top and bottom surfaces 32 and 33, respectively. The bottom surface 33 which define the forward end of the holder is provided with a projection 35 which carries a cutting insert 34 for grooving. A row of holes 17b extends through the holder perpendicularly to the front surface 30. All three holes 17b are untapped. The holder may have an inclined threaded boring 36 in order to receive a screw adapted for holding a different kind of grooving insert.

The cam shaft tool is assembled, preferably before it is mounted to the lathe, as follows. The holes 20 of the main block are provided with adjustment screws 41, the head of each facing inwardly from the upper flange 14. A pin 39 is inserted into the mid hole of each row such that a rear part 39a enters into said mid hole while an enlarged cylindrical eccentric part 39b rests upon the mid surface of the main block. The eccentricpart is offset relative to the main axis of the pin 39. The adjustment blocks 22, preferably five pieces, are put into the recess 12 of the main block 11 such that the holes 17a of each adjustment block are aligned with the row of holes 17 in the main block 11. Therefore the first top surfaces 25, the rear surface 24 and the first bottom surface 26 of the adjustment block 22 will abut against the upper inclined surface 18, the mid surface of the base section and the lower inclined surface 19 of the main block 11, respectively. Alternatively there may be a play between the mid surface of the base section and the rear surface 24 of the adjustment block. The mid hole has a rear non-cylindrical enlargement; an oval enlargement for example, which receives the eccentric part 39b of the pin 39. Then the holders 29 are put upon respective ones of said adjustment blocks 22 such that the V-shaped recessed rear surface 31 of each holder 29 abuts against the convexly V-shaped front surface 23 of the corresponding adjustment block, and such that the holes 17b get aligned with the holes 17 and 17a of the main block and the adjustment block, respectively, and such that the mid hole receives the remaining part of the pin 39. The holders 29 positioned on one main block may carry different kinds of grooving inserts 34. Then two bolts 40a and 40b are put through the whole package and are fastened such that the heads of the bolts lightly abut the front surface of the holder.

Referring now to FIGS. 8A, 8B and 8C wherein another embodiment of a cam shaft tool is shown and wherein the cam shaft tool has radial and axial setting means as described above.

The main block 111 has a recess 112 which extends in the axial direction of the work piece. The recess 112 is bordered by walls 125 and 126 which are parallel and extend generally perpendicular to the radial and axial directions of the work piece. Each wall connects to a generally planar first surface 150 and 151 at each side of the recess 112. Each first surface extends along the connected wall. The adjustment or second block 122 has a base portion provided with a projection 152 projecting into said recess 112 and generally planar third surfaces 153 and 154. The projection 152 defines second surfaces 155 and 156 which extend generally parallel with each other and connect generally perpendicularly to said third surfaces 153 and 154. The lengths of the recess and the projection in said radial direction are mainly identical. When mounted the second surfaces 155 and 156 of the recess abut against the walls 125 and 126 and the third surfaces 153 and 154 abut against the first surfaces 150 and 151 thereby gaining an axial guidance of the second block 152 and the holder 29. The front surface 23 of the second block 122 and the rear surface 31 of the holder 29 are identical with the ones described above.

Figure 10:
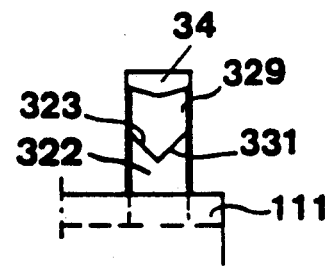
FIG. 10 shows another embodiment of a cam shaft tool according to the invention in a bottom view.

Referring now to FIGS. 9 and 10 wherein two other embodiments of a cam shaft tool are shown and wherein the tool has radial and axial setting means as described above. Furthermore the cooperating surfaces of the main block 111 and the second block 222 are as described above in connection with FIGS. 8A, 8B and 8C. FIG. 9 shows a bottom view of the tool. The front surface of the second block 222 is provided with a projection or key 257 which extends in the longitudinal direction of the second block 222 which is the same as the radial direction of the work piece. The rear surface of the holder 229 has a longitudinally extending recess 258 which is complementary to said projection. The bottom of the recess and the crest of the projection preferably form a clearance therebetween in order to clearly define abutment of sides of the projection against the walls of the recess and abutment of planar surfaces surrounding said projection and said recess. Alternatively the shape shown may be inverted such that the recess is provided at the second block and the projection is provided at the holder. FIG. 10 shows a bottom view of the cam shaft tool. The front surface 323 of the second block 322 is V-shaped and inverted relative to the tools shown in FIGS. 1 to 8C. Thus the apex of the V-shape is directed towards the main block 111. The rear surface 331 of the holder 329 has a shape complementary to the shape of said front surface.

Figure 11C:
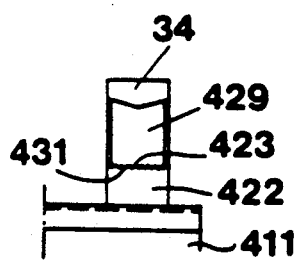

Referring now to FIGS. 11A, 11B and 11C wherein another embodiment of a cam shaft tool is shown and wherein the tool has radial and axial setting means as described above. The cooperating surfaces of the main block 411 and the second block 422 comprise serrations. Thus the front surface 450 of the main block 411 is serrated in the axial direction of the work piece and the rear surface 453 of the second block 422 is serrated in the same direction. The serrations give rise to cooperating projections and recesses which alternate in the blocks for axial guidance of the second block. Corresponding serrations are made in the front surface 423 of the second block 422 and in the rear surface 431 of the holder 429 but perpendicular thereto, i e in the radial direction of the work piece, for radial guidance of the holder.

OPERATION

The general operation of the different embodiments of the cam shaft tools is mainly identical and therefore the operation will be described in connection only with the embodiment shown in FIGS. 1 to 7C.

The lathe in which the cam shaft tool assembly is mounted is of a conventional type, and therefore the whole lathe is not shown. The lathe is provided with three slides 37a, 37b and 37c radially movable independent of each other, up and down in the lathe. Each slide 37a, 37b and 37c is guided by transversely extending infeed ways (not shown) in a conventional manner and is radially fed by conventional hydraulic means back and forth between active and inactive positions. A main block 11 is mounted on a slide 37a, for example, by interfitting dove-tail profiles and clamped thereto by fastening means, such as bolts and threaded borings, represented by the centerlines $CL_1$ in FIG. 3A. The dowel pin 21 of the main block is fitted into a hole in the slide 37a thereby assuring that the main block is the correct one for just that slide. Thus the pin 21 functions in co-operation with said hole as an identification means. When setting the position of the cutting edge of each cutting insert 34 a measuring apparatus (not shown) is to be placed under and beside the holder and in contact with the cutting insert. When the screw 41 is unscrewed the head thereof will abut the top surface 32 of the holder 29 so as to move the holder outwardly relative to the adjustment block 22 into the correct position determined by the measuring apparatus. The pin 39 has a key grip 42 in which a suitable key (not shown) may be entered such that the pin can be rotated. Thus the pin 39 when rotated urges the adjustment block and the holder in an axial direction $\pm \times$ mm via the abutment of the eccentric part 39b against the non-cylindrical enlargement 43 of the holder mid hole (FIG. 3A). Then the bolts 40a and 40b which are inserted with a diametrical play in the outermost holes of the block 22 and the holder 29 are somewhat tightened so as to see whether the cutting insert position changes. If it does not change the bolts are fully tightened but if the position changes it has to be corrected by rotating said pin to move the adjustment block 22 under a certain clamping pressure exerted by the bolts 40a and 40b, whereafter the bolts are fully tightened.

The above-mentioned positioning procedure is repeated for each set of adjustment block, holder and cutting insert on each of the main blocks. The radial and axial tolerances of the setting of the cutting insert is well within the required range $\pm 0.25$ mm. A work piece 44 in the shape of an elongated cylindrical rod is held preferably between a driving chuck and a tailstock (not shown) in FIGS. 1 and 2. When the cam shaft tools are lowered towards the work piece rotating in direction R, the cutting edges of the cutting inserts will make grooves of predetermined depths in the rod thereby achieving a blank for a cam shaft. The slides are fed by the hydraulic means in succession in order to reduce power requirements on the machine. Then the slides are retracted and the blank is loosened for transport to a grinding cell wherein the cams are ground.

While the invention has been described with respect to a preferred embodiment, it should be apparent to those skilled in the art that modifications may be made thereto without departing from the spirit and scope of the invention. For example the cooperating surfaces of the main block and the second block may be chosen from any of the shown embodiments and the cooperating surfaces of the second block and the holder can be chosen from any of the shown embodiments.

What is claimed is:

1. A cam shaft tool for cutting a plurality of grooves in a rotating work piece having a radial and an axial direction comprising:
    a first block having a plurality of second blocks mounted thereon, said first and second blocks having mating first abutment surfaces for guidance of said second block in said axial direction;
    each said second block carrying a holder having a cutting insert at a radially forward end thereof, each said second block and said holder including mating second abutment surfaces for guidance of said holder in said radial direction;
    a plurality of radial setting means for adjusting said holders relative to said second block in said radial direction;
    a plurality of axial setting means for adjusting said second blocks relative to said first block in said axial direction by moving said second blocks relative to said first blocks; and
    a plurality of fastening means for fixing the relative positions of said holders, said second blocks and said first block, each of said fastening means having a head portion that abuts a front face of the holder and that extends forwardly from the front face of the holder, said tool being constructed such that, other than portions of each of said fastening means, the area forward of the front faces of the holders is free of any structure that obstructs the removal of chips from the work piece and that substantially restricts the flow of coolant to the cutting region for cooling the tool and flushing away the chips.

2. A cam shaft tool as defined in claim 1, wherein each of said plurality of radial setting means adjusts the respective holder in said radial direction while the respective second block remains stationary, and each of said plurality of axial setting means adjusts the respective second block and the respective holder in said axial direction.

3. A cam shaft tool as defined in claim 2, wherein all of said cutting inserts lie in a single row that is substantially parallel to said axial direction.

* * * * *